No. 750,675. PATENTED JAN. 26, 1904.
E. MICHELIN.
NUT FOR SAFETY BOLTS, AIR VALVE CAPS, OR OTHER
ANALOGOUS PURPOSES.
APPLICATION FILED SEPT. 18, 1902.
NO MODEL. 2 SHEETS—SHEET 1.
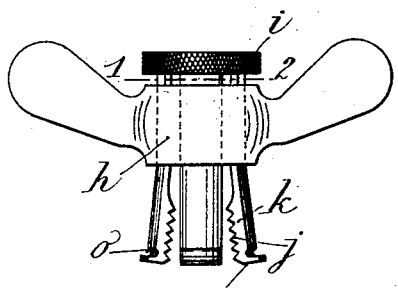
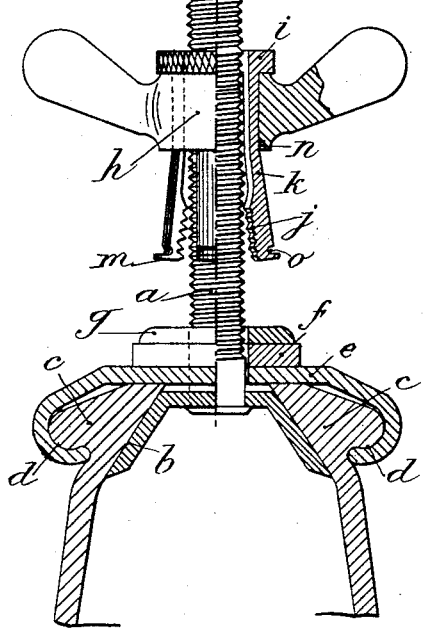
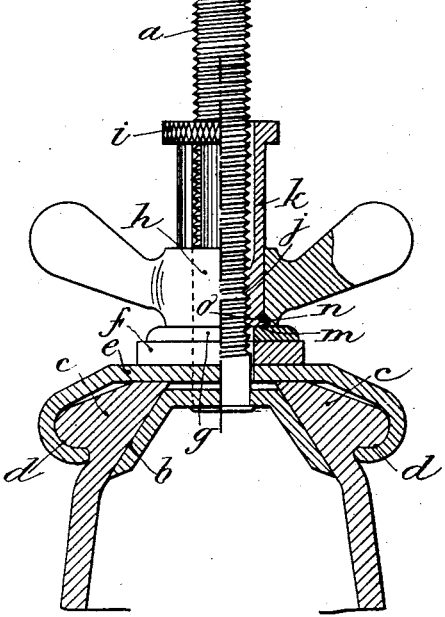
Witnesses:
Henry Thieme
George Barry Jr
Inventor:
Edouard Michelin
By attorneys
Brown & Seward No. 750,675. PATENTED JAN. 26, 1904.
E. MICHELIN.
NUT FOR SAFETY BOLTS, AIR VALVE CAPS, OR OTHER
ANALOGOUS PURPOSES.
APPLICATION FILED SEPT. 18, 1902.
NO MODEL. 2 SHEETS—SHEET 2.
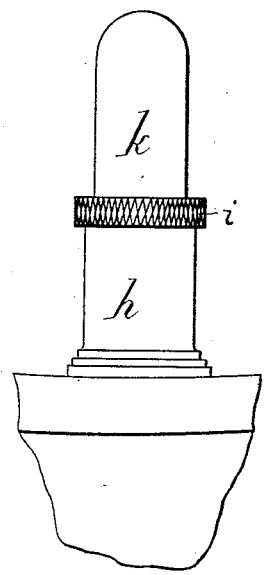
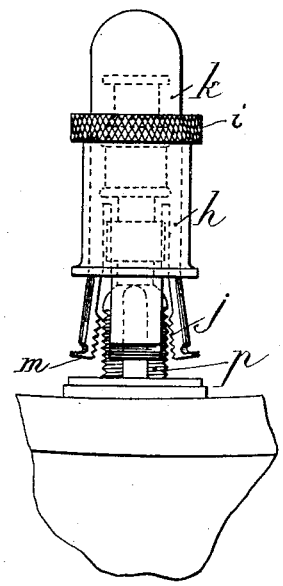
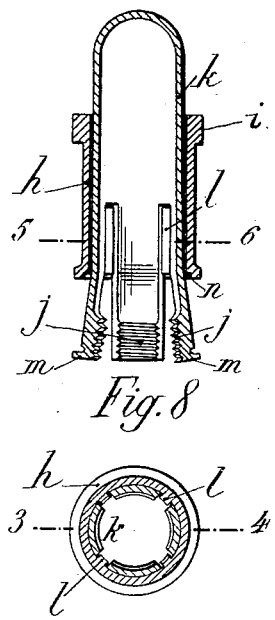
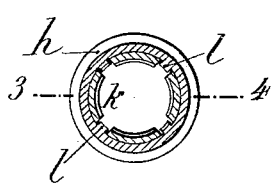
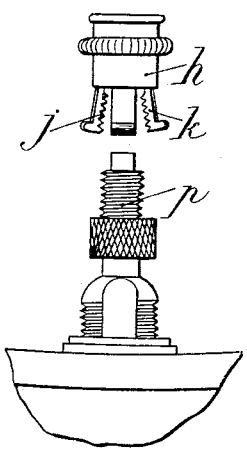
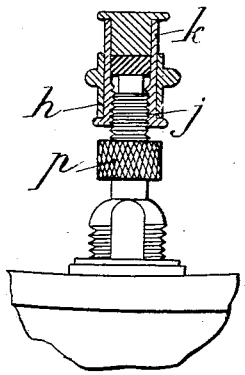

No. 750,675. Patented January 26, 1904.

UNITED STATES PATENT OFFICE.

EDOUARD MICHELIN, OF CLERMONT-FERRAND, FRANCE.

NUT FOR SAFETY-BOLTS, AIR-VALVE CAPS, OR OTHER ANALOGOUS PURPOSES.

SPECIFICATION forming part of Letters Patent No. 750,675, dated January 26, 1904.

Application filed September 18, 1902. Serial No. 123,848. (No model.)

*To all whom it may concern:*

Be it known that I, EDOUARD MICHELIN, engineer, a citizen of the Republic of France, residing at 15 Rue du Nord, Clermont-Ferrand, Puy-de-Dôme, France, have invented a new and useful Improvement in Nuts for Safety-Bolts, Air-Valve Caps, or other Analogous Purposes, of which the following is a specification.

The nut forming the object of the present application for patent is more especially applicable for safety-bolts for pneumatic tires fitted on the wheels of motor or other vehicles, bolts which have for their object the securing of the beadings or edges of the cover in the grooves of the rim. To facilitate the fixing and detaching of the tire, it is advisable that the safety-bolts should be of great length. The tightening by means of ordinary nuts therefore takes a long time, since these nuts have to travel the whole length of the screw-thread. The object of the present arrangement is to remedy this disadvantage.

This new nut is, in fact, constructed in such a manner that it is only necessary to cause its screw-thread to engage that of the bolt just at the moment when there only remains one or two turns to be given to the nut in order to effect the binding. An economy of time and, further, an economy from the point of view of the wear is thus effected, the nuts having no longer, as hitherto, to act along the whole length of the stem of the bolt.

Similar advantages are obtained when the improved nut is applied to a cap of air-valve, in which case one member of said nut is closed at one end, so that itself constitutes the cap.

The accompanying drawings illustrate a method of carrying the present invention into effect.

Figure 1 is an elevation of the nut applied to a safety-bolt; Fig. 2, a transverse section on line 1 2, Fig. 1. Fig. 3 illustrates, one-half in section, one-half in elevation, the nut placed over the bolt and at the moment when the screw-threads are not yet engaged. Fig. 4 illustrates, also one half in section and the other half in elevation, the nut in its position for binding. Fig. 5 is an elevation of a valve-cap of a pneumatic tire for motor or other vehicles, such cap being shown as tightened on the valve. Fig. 6 is an elevation of the valve-cap and nut, showing the parts in their position before the external sliding part has been moved down the cap. Fig. 7 is a separate view of the cap and nut in longitudinal section on line 3 4, Fig. 8, the parts being in the same position as in Fig. 6. Fig. 8 is a transverse section on line 5 5, Fig. 7. Fig. 9 is an elevation showing a valve for a pneumatic tire for cycles and the cap and nut for such valve in the opened position. Fig. 10 is a similar view, partly in section, showing the external member after it has been moved down the cap.

In Figs. 1 to 4, $a$ is the bolt; $b$, the head of this bolt, the special form of which enables it to push the beadings or edges $c$ of the cover of the tire into the grooves $d$ of the rim $e$ and to hold them there. An india-rubber washer $f$ is interposed between the rim $e$ and the metallic washer $g$. The washer $f$, owing to its elasticity, insures the holding of the nut in place, and at the same time facilitates its action.

The nut is formed of two distinct pieces— a sleeve provided with a screw-thread and a binding part. The latter is represented as being in the form of a cylindrical ring $h$ having ears; but it is evident that it might be also composed of a ring of polygonal exterior form, which could be turned by a spanner or key.

The sleeve $k$ terminates at its upper part in a kind of outer collar $i$, which may with advantage be milled. At its lower part $j$ this sleeve is screw-threaded at the same pitch as the bolt, having about five or six turns of thread. The remaining part is bored to a diameter slightly in excess of that of the stem of the bolt. Except for the length of the collar $i$ the sleeve is, further, split at a certain number of generating-points, (four being shown in the drawings arranged on two diameters at ninety degrees to each other.) The lower portions of the arms thus formed spread outward, so that normally and in spite of the screw-thread the sleeve can slide freely over the bolt.

The binding-ring $h$ can not only slide longitudinally on the sleeve $k$, but also carry the latter with it in its rotation. For this purpose this ring is provided with webs $l$ of a number equal to that of the slots of the sleeve and not projecting sufficiently to touch the screw-thread of the bolt.

In order to prevent the binding part becoming detached from the sleeve on which it is placed, the lower extremity $m$ of the latter is formed with a flange, Figs. 1, 3, and 4, which has the further advantage of better distributing the pressure which the part is capable of exercising upon the washer $g$. In order that this flange may not prevent the base of the binding part coming in contact with the washer, this base is bored to a diameter slightly greater than that of the part $m$, as will be seen clearly at $n$ in Figs. 3 and 4. The latter may, further, be advantageously provided with a groove $o$, diminishing the chances of binding.

The method of operation is very simple. The bolt $a$ being in position after having caused the binding part $h$ to slide along until it bears against the collar $i$, the nut composed of the sleeve $k$ and the binding part $h$ is placed over the bolt, Fig. 3, and the collar $i$ is acted upon so as to bring the under surface $m$ in contact with the washer $g$. In this position of the binding part the lower screw-threaded part $j$ of the arms is spread out, so that the screw-threads do not interfere with the sliding. When once contact between the surface $m$ and the washer $g$ is established, the part $h$ is caused to slide along the sleeve $k$ until its base abuts against this washer. This movement has the effect of compressing the arms and placing the screw-thread thereof in engagement with that of the bolt. It will be understood that then it is only necessary to impart to the binding part $h$ a very slight rotary movement (one or two turns) in order to obtain the perfect binding.

It of course follows that the loosening is effected by inverse operations and with a facility and rapidity at least as great as the tightening.

When the improvement is applied to caps of air-valves for pneumatic tires, Figs. 5 to 10, the cap itself, $k$, serves as one of the members of the nut, and to that purpose it is split on a portion of its length, as hereinbefore explained, while its other end is closed, of course. The other member, $h$, is by preference of a tubular form, with a milled head or bead $i$, as shown.

The thread cut on the inside of the cap $k$ can slip freely along the thread on the valve $p$ when the arms are spread out, while it screws on it when the tubular part $h$ is turned by means of the milled part after being moved along to engage the male and female threads with each other, and generally the operation is the same as in the case of the nuts for safety-bolts.

What I claim as my invention, and desire to secure by Letters Patent, is—

1. The combination of a sleeve of which a portion only of the length contains a female screw-thread adapted to receive and engage an externally-screw-threaded central part and which portion is divided by longitudinal cuts or slots into several arms having a tendency to so spread out from the center as to permit the sleeve to slide freely along the central part, and an outer socket surrounding this sleeve and capable of sliding along it and so compressing its arms and causing their screw-thread to engage the screw-thread of the central part, said outer socket being provided with interior projections so engaging the slots between the arms of said sleeve that when it is turned it carries the latter with it with the screw-thread of said arms in engagement with the screw-thread of said central part.

2. The combination of a sleeve the lower portion only of which contains a female screw-thread adapted to receive and engage an externally-threaded central part and which portion is divided by longitudinal slots into several arms having a tendency to so spread out from the center as to permit the sleeve to slide freely along said central part, said sleeve being also provided with an enlargement at its upper and also at its lower part, and a socket surrounding this sleeve and capable of sliding along it down to the bottom, so as to compress the arms and cause their screw-thread to bite the screw-thread of the central part, this outer socket being provided with interior projections engaging the slots situated between the arms of the interior sleeve, so that when it is turned it carries the latter with it in its rotation and thus produces the desired binding, and being provided also with an interior annular recess at its lower part, so as not to be arrested in its descent by the projection of the sleeve which it surrounds.

In testimony that I claim the foregoing as my invention I have signed my name, in presence of two witnesses, this 4th day of September, 1902.

EDOUARD MICHELIN.

Witnesses:
EDWARD P. MacLEAN,
GASTON DUREICE.